United States Patent
Stavely et al.

(10) Patent No.: US 7,298,414 B2
(45) Date of Patent: Nov. 20, 2007

(54) DIGITAL CAMERA AUTOFOCUS USING EYE FOCUS MEASUREMENT

(75) Inventors: Donald J. Stavely, Windsor, CO (US); David K. Campbell, Loveland, CA (US); Eric F. Aas, Windsor, CO (US); Gregory V. Hofer, Loveland, OR (US); Scott A. Woods, Bellvue, CO (US); Dan L. Dalton, Greeley, CO (US); Kurt E. Spears, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 864 days.

(21) Appl. No.: 10/353,675

(22) Filed: Jan. 29, 2003

(65) Prior Publication Data

US 2004/0165099 A1    Aug. 26, 2004

(51) Int. Cl.
*G03B 13/00* (2006.01)
(52) U.S. Cl. ..................... 348/350; 348/350
(58) Field of Classification Search ............. None
See application file for complete search history.

(56) References Cited

U.S. PATENT DOCUMENTS

| | | | |
|---|---|---|---|
| 5,155,516 A | 10/1992 | Shindo | |
| 5,327,191 A | 7/1994 | Shindo et al. | |
| 5,331,149 A | 7/1994 | Spitzer et al. | |
| 5,486,892 A * | 1/1996 | Suzuki et al. | 396/51 |
| 5,557,364 A | 9/1996 | Shindo et al. | |
| 5,608,489 A | 3/1997 | Ozaki | |
| 5,610,681 A | 3/1997 | Nagano et al. | |
| 5,614,985 A | 3/1997 | Odaka | |
| 5,857,120 A | 1/1999 | Konishi | |
| 5,882,301 A | 3/1999 | Yoshida | |
| RE36,237 E | 6/1999 | Shindo | |
| 6,014,524 A | 1/2000 | Suzuki et al. | |
| 6,027,216 A | 2/2000 | Guyton et al. | |
| 6,072,443 A | 6/2000 | Nasserbakht et al. | |
| 6,394,602 B1 | 5/2002 | Morrison et al. | |
| 6,522,360 B1 * | 2/2003 | Miyawaki et al. | 348/347 |

FOREIGN PATENT DOCUMENTS

| JP | 63-40112 A | 2/1988 |
|---|---|---|
| JP | 63-40525 A | 2/1988 |
| JP | 63-40625 A | 2/1988 |

* cited by examiner

*Primary Examiner*—Vivek Srivastava
*Assistant Examiner*—Anthony J. Daniels

(57) ABSTRACT

Viewfinder apparatus, methods, and digital cameras that provide autofocus using retroreflected eye focus measurements. When a user looks at a part of a scene that is the intended subject of the image, his or her eye is correctly focused. The present invention measures the focus distance of the eye when the eye is focused on the desired location in the scene, and then uses the measured distance to set the focus of the camera.

9 Claims, 3 Drawing Sheets

FOCUS RETROREFLECTED IMAGE OF SCENE

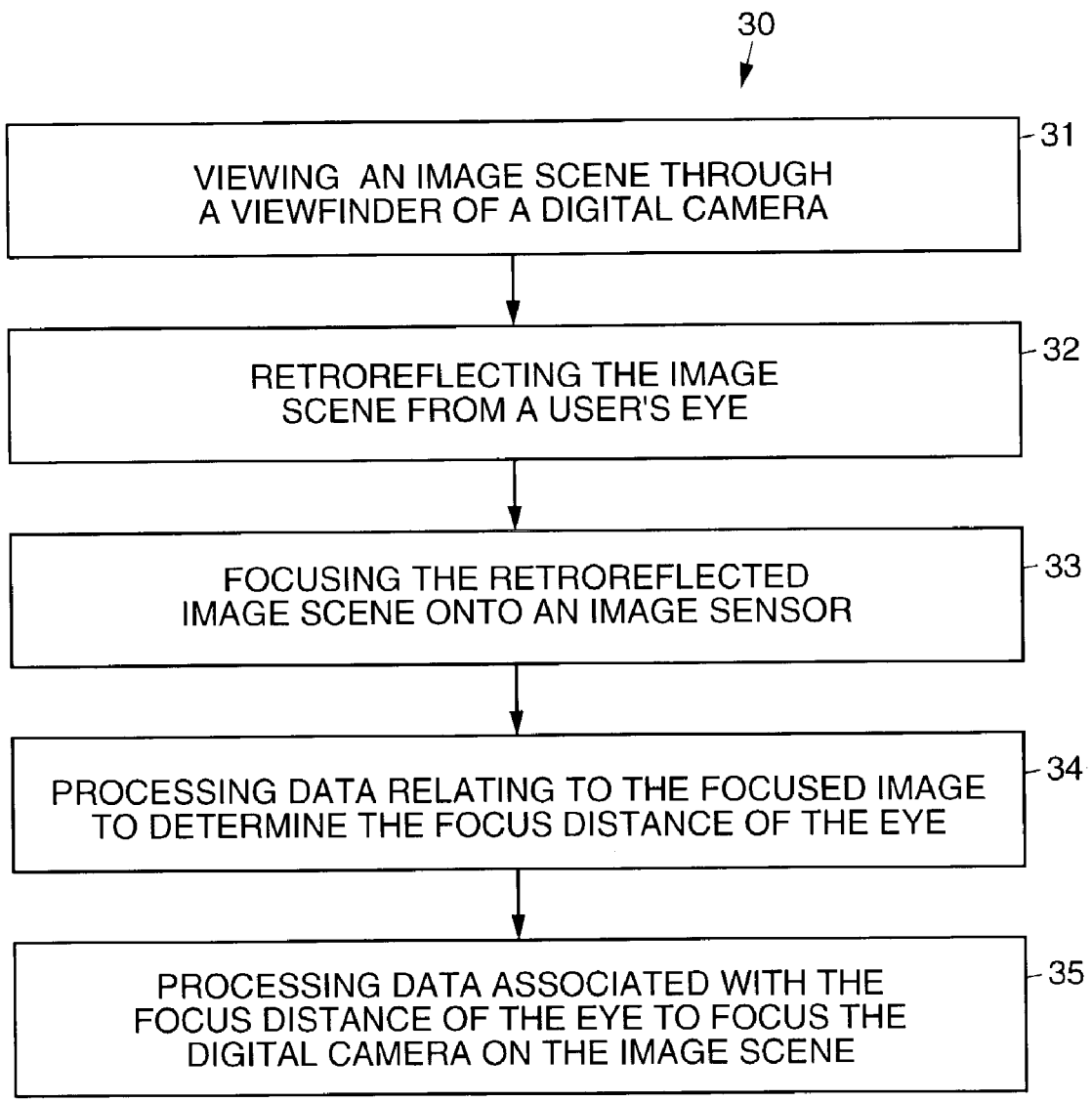

DIGITAL CAMERA AUTOFOCUS USING EYE FOCUS MEASUREMENT

TECHNICAL FIELD

The present invention relates generally to digital cameras, and more specifically, to the use of retroreflected eye focus measurements to autofocus a digital camera.

BACKGROUND

Autofocus has become a standard feature on both film and digital cameras. Despite years of innovation and development, autofocus still has several problems that often result in out-of-focus images.

The biggest issue is user intent. In a scene with objects at multiple distances, the camera must choose which part of the image the user would like to be in focus. The conventional solution is to focus on center region of the image, assuming the subject is in the center. This technique fails in the classic case of two people standing side-by-side, with the camera focusing on the background between them.

In addition, conventional autofocus techniques on digital cameras are also slow, power-hungry, and inaccurate in low contrast or low light conditions.

One sophisticated approach to the problem of user intent for autofocus is the use of eye tracking. As a user looks into the viewfinder, an IR emitter and detector array track where the user is looking while framing the shot. The camera then uses an autofocus zone or spot at that position in the scene. An autofocus algorithm then proceeds conventionally, using the image as seen through the camera lens. However, this solution still suffers from the speed, power, and accuracy issues of conventional autofocus.

Prior art relating to the present invention is as follows.

U.S. Pat. No. 6,072,443 discloses an "ocular projection display (12) projects an image directly to the eye (26) of the user (10). The focus of the image may be varied to allow for different user profiles or to relieve the stress of maintaining a fixed focus over a prolonged period of time. Optionally, the ocular projection display (12) can include a location and distance sensor (46) for identifying the location of the user's eyes for proper aiming of the image to the eyes of the user and focus detection circuitry (54) to correct for the user's focusing abilities."

U.S. Pat. No. 5,857,120 discloses an "eye axis detector for detecting to which position the eye axis of a user is directed in a picture, comprising means for dividing and specifying the picture into a plurality of pictures, and means for extracting the watching point of the user using a plurality of types of eye axis information concerning the eye axis in each area within such divided picture."

U.S. Pat. No. 5,155,516 discloses a "view finder optical system including a window of an eye piece portion comprising an eye cup having a contact surface, a shape of the contact surface being made so as to incline an axis of the lens with respect to an axis of the eye piece. The shape of the contact surface is curved corresponding to the lens's shape. The contact surface is made so as to conform to a lens of glasses."

U.S. Pat. No. 5,608,489 discloses an "anamorphic lens system in an eye direction detection device, applied to an observing optical system, modifies illumination light from a light source to be parallel in a lateral direction of a user's eye positioned to look through the observing optical system, dispersed in a vertical direction of the position of the user's eye, and substantially centered on the position of the user's eye. The anamorphic lens system transmits the illumination light from the light source to an illumination light exit surface positioned away from the optical axis of the observing optical system, and the illumination light is projected toward the position of the user's eye from the illumination light exit surface to separate signals from the image of the eye and an image formed by eyeglasses, if worn. The illumination light exit surface is a rectangular window having a longitudinal side parallel to longitudinal side of a field of view of the observing optical system, and is positioned below the position of a user's eye."

U.S. Reissue Pat. No. RE36,237 (which corresponds to U.S. Pat. No. 5,155,516) discloses a "view finder optical system including a window of an eye piece portion comprising an eye cup having a contact surface, a shape of the contact surface being made so as to incline an axis of the lens with respect to an axis of the eye piece. The shape of the contact surface is curved corresponding to the lens's shape. The contact surface is made so as to conform to a lens of glasses."

U.S. Pat. Nos. 5,327,191 and 5,557,364 disclose an "eye direction detecting apparatus for a camera having a light transferring system for guiding a beam of parallel light rays to an eye of a photographer includes a light receiving system having a light receiving portion on which a first Purkinje image based on specular reflection of a cornea of the eye and reflecting light from a retina of the eye is formed, the light receiving portion generating a light receiving output. The apparatus further includes a processing circuit for detecting the eye direction of the eye based on the light receiving output of the light receiving portion. Further, according to the teachings of the present invention, including an optical member having certain identically inclined surfaces prevents refracted light from forming a ghost image within the light receiving system of an eye direction detecting apparatus."

U.S. Pat. No. 5,331,149 discloses an "eye tracking system is disclosed which is comprised of an eye tracking module formed of a display joined to a photodetector array. Each pixel in the display is aligned with a corresponding photodetector. An image generated by the display is projected onto a viewing screen or toward a viewer. Axial light rays from the display pixels are reflected by the eye and detected by a respective photodetector which generates an electrical signal indicative of eye position."

U.S. Pat. No. 5,614,985 discloses a "camera having sight line detection means for detecting the line of sight of an observer, focus detection means having plural focus detection areas and capable of focus detection in each focus detecting area, and selection means for selecting at least one of the plural focus detecting areas, based on the information of the line of sight detected by the sight line detection means, wherein the selection means is adapted to select the focus detecting area based on the result of focus detection by the focus detection means, according to the state of detection of the line of sight by the sight line detection means."

U.S. Pat. No. 5,882,301 discloses that "Relative directions of excitation and photoreceiving optical systems are so set that an angle formed by optical axes thereof in the air is 14°, and an eyeball is fixed in such a direction that its ocular axis divides the angle formed by the optical axes into two equal parts. On a light incidence side of a one-dimensional solid-state image pickup device of the photoreceiving optical system, a slit is arranged for inputting measuring light components generated from portions of the eyeball having different depth positions on an excitation light beam in photoelectric conversion elements of different positions of the image pickup device. The measuring light components generated from the respective portions of the eyeball parallel to the optical axis are incident upon the one-dimensional solid-state image pickup device through the slit and simultaneously detected, so that the positions of the photoelectric conversion elements and measuring light component generating positions at the eyeball correspond to each other."

U.S. Pat. No. 5,610,681 discloses an "apparatus having an irradiation device for irradiating the eye of an observer; a sensor having a number of pixels with a set pitch; an image forming optical unit for imaging light reflected by the eye onto the sensor; and an electronic circuit for making a signal denoting the direction of the line of sight of the eye in accordance with an output from the sensor, wherein the relationship expressed by Pitch X/β<0.41 mm is satisfied when an assumption is made that the image forming magnification of the image forming unit is β and the pitch of the pixels of the sensor is Pitch X so that accuracy in detecting the line of sight of the eye is improved."

U.S. Pat. No. 6,014,524 discloses a "camera comprising: finder means for inspecting an object, illumination means for illuminating an operator's eye by which the operator looks in at the finder means, a condensing optical system for condensing a reflected light from the operator's eye, photoelectric converter means for receiving the condensed reflected light, calculation means for calculating a direction of a visual axis of the operator's eye on the basis of an output of the photoelectric converter means, and condition setting means operable in response to the result of the calculation of the calculation means, for setting taking conditions of the camera"

U.S. Pat. No. 6,394,602 discloses an "optical instrument, such as a microscope or a camera, is provided for forming a viewable image of an object. The optical instrument comprises an objective lens for forming the viewable image at an image plane, an eye sensor for sensing the direction of gaze of a user viewing the viewable image and means for controlling a controllable function of the optical instrument in dependence upon the sensed direction of gaze. The eye sensor comprises a sensor lens for focusing light reflected from the retina of the user, an imaging transducer located at a plane which is conjugate to the image plane with respect to the sensor lens, for generating an electrical image sign of a portion of the user's retina, a memory for storing retinal image information of the user and circuitry for comparing the retinal image signal generated by the imaging transducer with the stored retinal image information to generate gaze information indicative of the direction of gaze of the user"

U.S. Pat. No. 6,027,216 discloses "Apparatus and method are provided for assessing the direction of fixation of an eye by detecting polarization-related changes in light retroreflected from the fundus of the eye. Nerve fibers in the retina of the eye are birefringent and alter the polarization state of light traversing them as a function of their orientation. The nerve fibers are arrayed in a characteristic pattern in the retina, specifically radiating outward from the fovea and converging to the optic nerve head. By assessment of polarization-related changes in retroreflected light from multiple retinal areas either sequentially or simultaneously, characteristic birefringence signatures of portions of the retina can be identified which are used to assess the direction of fixation of the eye. In addition, interference from the corneal birefringence is reduced by using incident light having a polarization state that is substantially independent of meridional direction. Circularly polarized light or non-polarized light is used for the assessment. Interference from the corneal birefringence is reduced still further by detecting polarization-related changes that are substantially independent of the meridional direction of the corneal birefringence. This is accomplished by detecting changes in ellipticity by measuring solely the Stokes parameter $S_3$ or by measuring any two Stokes parameters. An alternative is measuring the overall intensity of the retroreflected light when the dichroism of the lutein pigment particles in the vicinity of the fovea is used for the assessment."

However, none of the prior art references discloses or suggests using retroreflected eye focus measurements to measure the focus distance of the eye, and use this distance to set the focus of the camera.

It is an objective of the present invention to provide for a digital camera, viewfinder apparatus and methods that use retroreflected eye focus measurements to provide autofocus, and that improves over conventional implementations.

SUMMARY OF THE INVENTION

To accomplish the above and other objectives, the present invention provides for viewfinder apparatus, digital cameras and methods that provide autofocus using retroreflected eye focus measurements. When a user looks at a part of a scene that is the intended subject of the image, the eye is correctly focused on that point. Rather than tracking the position of the eye, the present invention measures the focus distance of the eye, and then uses this distance to set the focus of the camera. The camera does not detect the focus of the scene to determine focus.

Like the eye-tracking technique described in the Background section, the problem of user intent is solved. In addition, the present invention takes advantage of the superior autofocus capability of the human eye. The present invention is faster, more accurate, and more robust in low contrast and low light conditions than conventional electronic autofocus systems.

In addition, the present invention can be used advantageously for video recording. Other techniques which use the camera's lens and sensor for focusing require the lens to "hunt around" the point of best focus, resulting in video images which are periodically out of focus. The present invention avoids this problem by "hunting around" to find the focus distance of the user's eye, without disrupting the focus of the camera lens.

BRIEF DESCRIPTION OF THE DRAWINGS

The various features and advantages of embodiments of the present invention may be more readily understood with reference to the following detailed description taken in conjunction with the accompanying drawings, wherein like reference numerals designate like structural elements, and in which:

FIG. 5 illustrates an exemplary method in accordance with the principles of the present invention.

DETAILED DESCRIPTION

Figure 1:
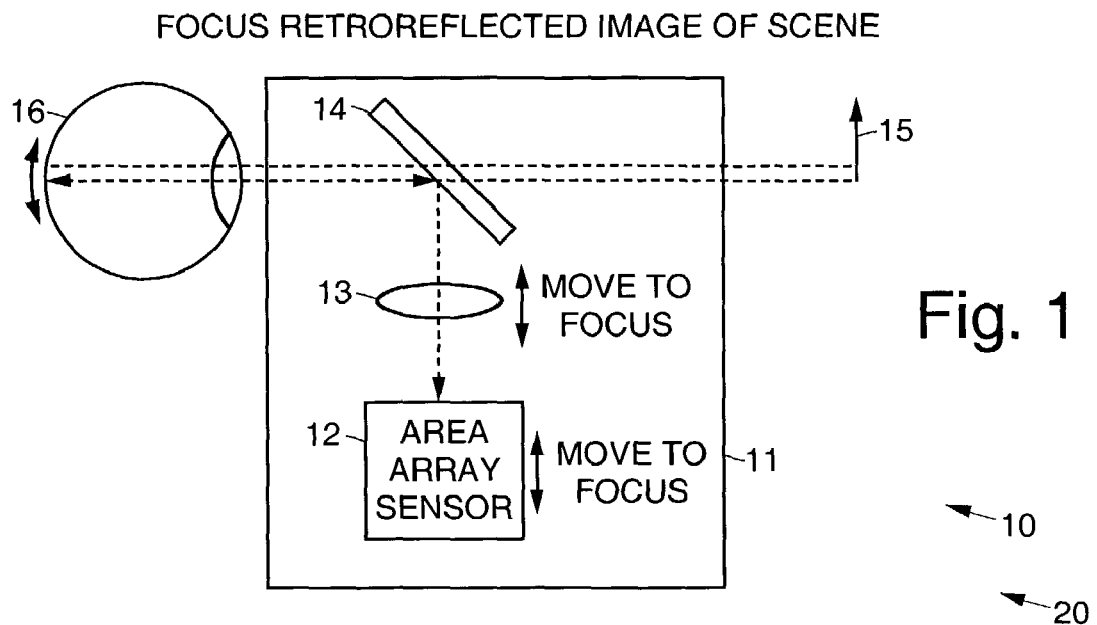
FIG. 1 illustrates a first exemplary embodiment of digital camera autofocus apparatus in accordance with the principles of the present invention.

Referring to the sole drawing figures, FIG. 1 illustrates a first exemplary embodiment of autofocus apparatus 10 (digital camera autofocus apparatus 10) in accordance with the principles of the present invention for use with a digital camera 20. The first exemplary embodiment of the digital camera autofocus apparatus 10 focuses a retroreflected image of a scene 15.

The first exemplary embodiment of the digital camera autofocus apparatus 10 comprises a viewfinder 11 through which a user looks using his or her eye 16. The viewfinder 11 comprises a selectively movable area array image sensor 12, a selectively movable optical element 13 or lens 13, and a beamsplitter 14 or angled partially reflective, partially transmissive mirror 14 disposed along an optical axis. A user views an image scene or target 15 through the beamsplitter 14 or angled partially reflective, partially transmissive mirror 14.

When a user looks at a part of a scene that is the intended subject of the image, the user's eye 16 is correctly focused on that point. Rather than tracking the position of the eye 16, the present autofocus apparatus 10 measures the focus distance of the eye 16, and uses this distance to set the focus of the camera 20. The camera 20 does not detect the focus of the scene.

Eye-focus sensing elements comprising the sensor 12, movable optical element 13 or lens 13, and beamsplitter 14 or angled partially reflective, partially transmissive mirror 14 are built into the viewfinder 11. It is simplest to imagine a reflex viewfinder 11 that does not contain any magnifying or focusing elements that would modify the user's view of the scene 15. The user views the scene 15 normally, and his or her eye 16 naturally focuses on the subject of interest.

The first exemplary embodiment of the autofocus apparatus 10 measures the focus distance of the eye 16 using a retroreflected image of the scene 15. As is shown in FIG. 1, the lens 13 and/or the image sensor 12 are moved until the image of the scene 15 projected on the retina 16a of the eye 16 is in focus on the sensor 12. The displacement of the lens 13 and/or sensor 12 provides a measure of the focus distance of the eye 16. The camera 20 is focused at a distance that is related to the displacement of the lens 13 and/or sensor 12 when the image on the retina 16a is in focus.

Setting the focus distance of the camera lens from the autofocus data derived from the measured focus distance of the eye may be done by several ways. One exemplary method is to use a pre-stored table, which maps displacements of the movable elements in the viewfinder apparatus described above to the appropriate displacements of the camera lens. This table may be generated as part of a factory calibration procedure, thus compensating for manufacturing variations in both the viewfinder and camera elements. Alternatively, the displacement of the camera lens can be derived from the displacement of the viewfinder elements by processing 35 via a mathematical formula.

Figure 2:
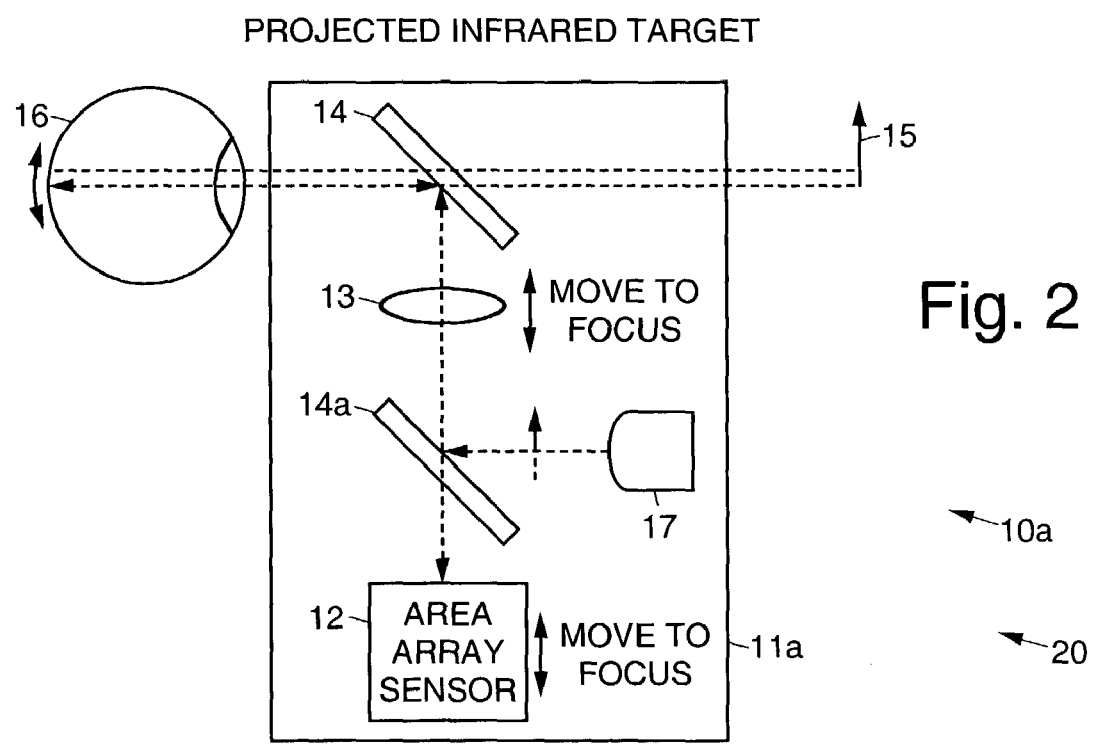
FIG. 2 illustrates a second exemplary embodiment of digital camera autofocus apparatus in accordance with the principles of the present invention.

FIG. 2 illustrates a second exemplary embodiment of digital camera autofocus apparatus 10a in accordance with the principles of the present invention. The second exemplary embodiment of the autofocus apparatus 10a comprises a selectively movable area array image sensor 12, a selectively movable optical element 13 or lens 13, a first beamsplitter 14 or angled partially reflective, partially transmissive mirror 14, and a second beamsplitter 14a or angled partially reflective, partially transmissive mirror 14a, each of which are disposed along a first optical axis. An infrared light emitting diode illuminator 17 is disposed along a second optical axis that intersects the second beamsplitter 14a or angled partially reflective, partially transmissive mirror.

The second exemplary embodiment of digital camera autofocus apparatus 10a works in low-light situations and projects a near-infrared image of an image 15 or target 15 into the eye 16 through the second beamsplitter 14a as is shown in FIG. 2. The retroreflected image of the target 15 is sensed by the infrared image sensor 12. As discussed with reference to FIG. 1, the lens 13 and/or sensor 12 are moved until the image of the target 15 projected on the retina 16a is in focus, and the displacement of the lens 13 and/or sensor 12 is a measure of the focus distance of the eye 16.

Figure 3:
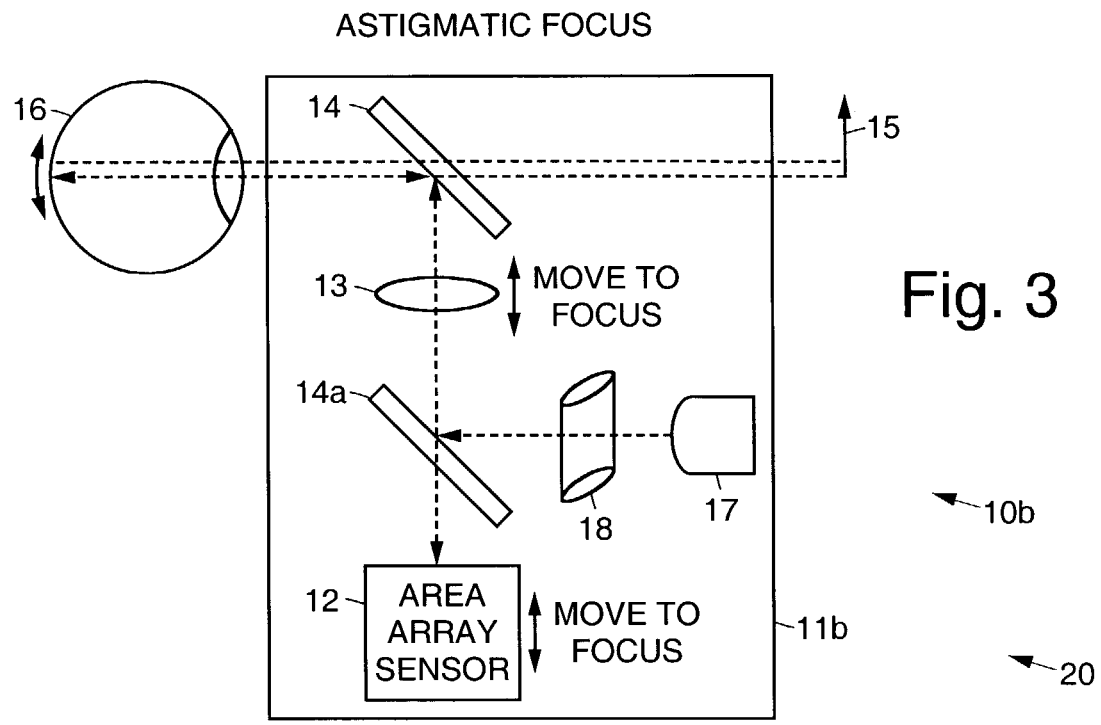
FIG. 3 illustrates a third exemplary embodiment of digital camera autofocus apparatus in accordance with the principles of the present invention.

FIG. 3 illustrates a third exemplary embodiment of digital camera autofocus apparatus 10b in accordance with the principles of the present invention. The third exemplary embodiment of the autofocus apparatus 10b comprises a selectively movable area array image sensor 12, a selectively movable optical element 13 or lens 13, a first beamsplitter 14 or angled partially reflective, partially transmissive mirror 14, a second beamsplitter 14a or angled partially reflective, partially transmissive mirror 14a, each of which are disposed along a first optical axis.

An infrared light emitting diode illuminator 17 is disposed along a second optical axis that intersects the second beamsplitter 14a or angled partially reflective, partially transmissive mirror. An astigmatic element 18 is interposed along the second optical axis between the infrared light emitting diode illuminator 17 and the second beamsplitter 14a or angled partially reflective, partially transmissive mirror 14a.

The third exemplary autofocus apparatus 10b is a variation that borrows from focus tracking techniques used on optical discs. The astigmatic element 18 is introduced in the infrared optical path as is shown in FIG. 3. As a result, the shape of a retroreflected spot or target 15 depends on the focus distance of the eye 16. This is used to generate a bipolar focus signal that is produced by the sensor 12. Bipolar focus signals have the advantage that the position of best focus is known (when balanced) and so tracking focus in real-time is easier and more robust.

Figure 4:
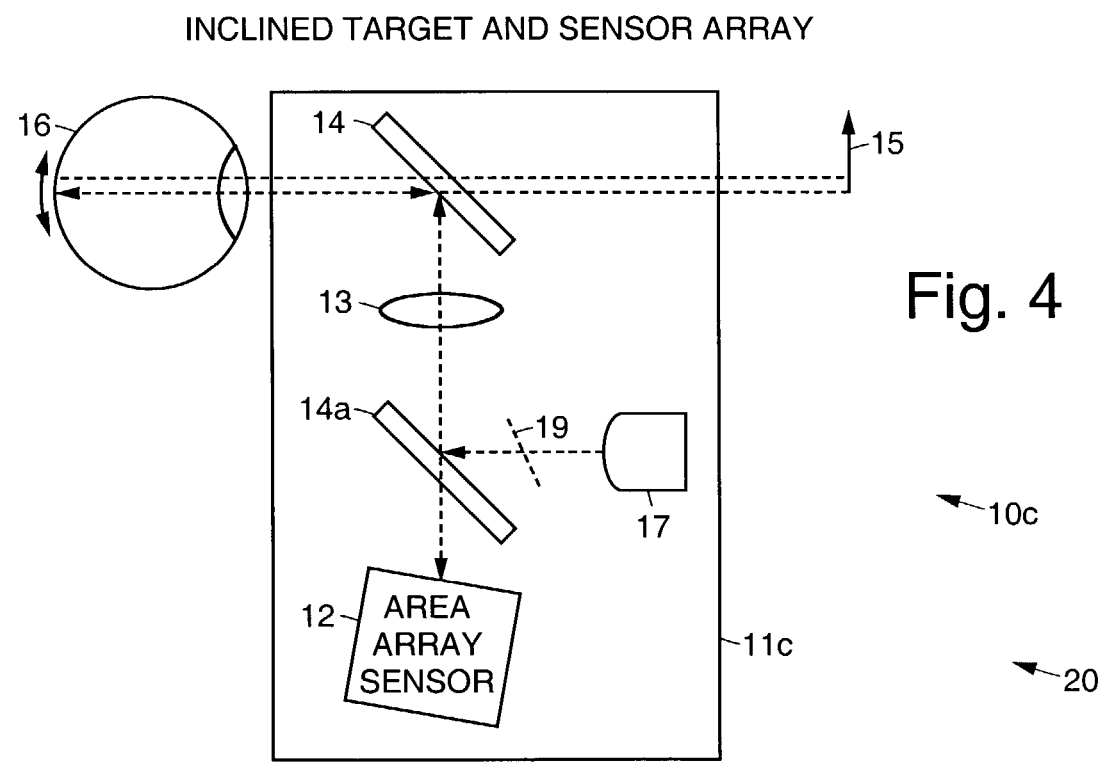
FIG. 4 illustrates a fourth exemplary embodiment of digital camera autofocus apparatus in accordance with the principles of the present invention.

FIG. 4 illustrates a fourth and perhaps best exemplary embodiment of digital camera autofocus apparatus 10c in accordance with the principles of the present invention. The fourth exemplary embodiment of the autofocus apparatus 10c comprises a tilted area array image sensor 12, an optical element 13 or lens 13, a first beamsplitter 14 or angled partially reflective, partially transmissive mirror 14, a second beamsplitter 14a or angled partially reflective, partially transmissive mirror 14a, each of which are disposed along a first optical axis. An infrared light emitting diode illuminator 17 is disposed along a second optical axis that intersects the second beamsplitter 14a or angled partially reflective, partially transmissive mirror 14a.

The fourth exemplary autofocus apparatus 10c produces a retroreflected pattern that contains a series of targets 15 at various focus depths. One way this may be accomplished is by inclining a target reticule 19 disposed between the illuminator 17 and the second beamsplitter 14a or angled partially reflective, partially transmissive mirror 14a, and inclining the sensor 12 to match the change in conjugate distance as is shown in FIG. 4. The retroreflected image has one area of the inclined target 15 in best focus. This generates near instantaneous focus measurement data and eliminates the need for moving the lens 13 or sensor 12.

Again it is assumed that the reflex viewfinder 11 that does not contain any optical elements that would modify the user's focus on the scene. It is possible to use any of these above-described techniques with convention optical viewfinders 11, including zooming viewfinders 11. Care must be taken to compensate for changes in focus distance introduced by the optical power on the viewfinder 11.

FIG. 5 illustrates an exemplary method 30 in accordance with the principles of the present invention. The exemplary method 30 comprises the following steps.

A user of a digital camera 20 views 31 an image scene 15 through a viewfinder 11. The image scene 15 is retroreflected 32 from the user's eye 16. The retroreflected image scene is focused 33 onto an image sensor 12. Data relating to the focused retroreflected image is processed 34 to determine the focus distance of the eye 16. Data associated with the focus distance of the eye 16 is processed 35 to focus the digital camera 20 on the image scene 15.

Additional detailed methods address operation of the various components of the above-described apparatus relating to movement of lens 13 or sensor 12. These methods should be readily apparent from reading the first part of this Detailed Description and will not be discussed in detail.

Thus, digital cameras and viewfinder apparatus that use retroreflected eye focus measurements to provide autofocus have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A digital camera autofocus apparatus comprising:
    a viewfinder through which a user looks with an eye that produces a focused image from light that is retroreflected from the eye, and associated data that are indicative of the focus distance of the eye, which data is used to focus the digital camera;
    the viewfinder comprising an area array image sensor, an optical element, and a beamsplitter disposed along an optical axis, at least one of which is selectively movable with respect to the others; and
    wherein data corresponding to the relative distance between the optical element and the sensor when the image on the retina is in focus are indicative of the focus distance of the eye, which data are used to focus the camera.

2. The apparatus recited in claim 1 wherein the viewfinder comprises an area array image sensor, an optical element, a first beamsplitter, and a second beamsplitter disposed along a first optical axis, and an infrared light emitting diode illuminator disposed along a second optical axis that intersects the second beamsplitter at least one of which is selectively movable with respect to the others.

3. The apparatus recited in claim 2 wherein data corresponding to the relative distance between the optical element and the sensor when the image on the retina is in focus are indicative of the focus distance of the eye, which data are used to focus the camera.

4. The apparatus recited in claim 1 wherein the viewfinder comprises an area array image sensor, an optical element, a first beamsplitter, and a second beamsplitter disposed along a first optical axis, an infrared light emitting diode illuminator disposed along a second optical axis tat intersects the second beamsplitter, and an astigmatic element interposed along the second optical axis between the infrared light emitting diode illuminator and the second beamsplitter.

5. The apparatus recited in claim 4 wherein data corresponding to the relative distance between the optical element and the sensor when the image on the retina is in focus are indicative of the focus distance of the eye, which data are used to focus the camera.

6. The apparatus recited in claim 1 wherein the viewfinder comprises a tilted area array image sensor, an optical element, a first beamsplitter, and a second beamsplitter disposed along a first optical axis, and an infrared light emitting diode illuminator disposed along a second optical axis that intersects the second beamsplitter and a target reticule disposed between the illuminator and the second beamsplitter.

7. The apparatus recited in claim 6 wherein a retroreflected pattern is produced by the sensor that contains a series of inclined targets at various focus depths, and wherein the target that is in best focus has data associated therewith that is used to focus the camera.

8. An autofocusing method for use with a digital camera, comprising the steps of:
    viewing an image scene through a viewfinder of a digital camera;
    retroreflecting the image scene from a user's eye;
    focusing the retroreflected image scene onto an image sensor;
    processing data relating to the focused image to determine the focus distance of the eye;and
    processing data associated with the focus distance of the eye to focus the digital camera on the image scene.

9. The autofocusing method recited in claim 8 wherein the viewfinder comprises an array image sensor, an optical element, and a beamsplitter disposed along an optical axis, and wherein the method comprises the step of:
    selectively moving the image sensor or optical element to focus the retroreflected image scene onto the image sensor.

* * * * *

UNITED STATES PATENT AND TRADEMARK OFFICE
CERTIFICATE OF CORRECTION

PATENT NO. : 7,298,414 B2 Page 1 of 1
APPLICATION NO. : 10/353675
DATED : November 20, 2007
INVENTOR(S) : Donald J. Stavely et al.

It is certified that error appears in the above-identified patent and that said Letters Patent is hereby corrected as shown below:

On the face page, in field (75), under "Inventors", in column 1, line 4, delete "OR" and insert -- CO --, therefor.

In column 8, line 10, in Claim 4, delete "tat" and insert -- that --, therefor.

In column 8, line 40, in Claim 8, after "focused" insert -- retroreflected --.

Signed and Sealed this

Fourth Day of November, 2008

JON W. DUDAS
*Director of the United States Patent and Trademark Office*